United States Patent
Froehlich et al.

[15] 3,635,718
[45] Jan. 18, 1972

[54] PROCESS FOR HARDENING WATER-SOLUBLE POLYMERS

[72] Inventors: Alfred Froehlich, Marly-le-Grand; Carlo Rossi, Bottmingen, both of Switzerland

[73] Assignee: CIBA Geigy AG, Basle, Switzerland

[22] Filed: Jan. 22, 1970

[21] Appl. No.: 5,158

Related U.S. Application Data

[63] Continuation-in-part of Ser. No. 709,881, Mar. 4, 1968, abandoned.

[30] Foreign Application Priority Data

Mar. 6, 1967    Switzerland ..........................3237/67

[52] U.S. Cl..................................96/111, 260/117, 106/125
[51] Int. Cl.........................................................G03c 1/30
[58] Field of Search......................96/111; 260/117; 106/125

[56] References Cited

UNITED STATES PATENTS

| | | | |
|---|---|---|---|
| 3,444,156 | 5/1969 | Montmollen et al | 96/111 |
| 3,455,893 | 7/1969 | Froehlich et al | 96/111 |
| 3,482,983 | 12/1969 | Bauriedel et al | 96/111 |

FOREIGN PATENTS OR APPLICATIONS

| | | | |
|---|---|---|---|
| 1,560,704 | 2/1969 | France | 96/111 |

*Primary Examiner*—Norman G. Torchin
*Assistant Examiner*—Richard E. Fichter
*Attorney*—Harry Goldsmith, Joseph G. Kolodny and Mario A. Monaco

[57] ABSTRACT

The present invention relates to a process for hardening water-soluble polymers, especially gelatine in the form of photographic emulsions with bis-acryloylimide. This hardener combines low molecular weight with a very great hardening capacity.

3 Claims, No Drawings

PROCESS FOR HARDENING WATER-SOLUBLE POLYMERS

This application is a continuation-in-part of our copending application Ser. No. 709,881, filed Mar. 4, 1968, now abandoned.

It has been proposed to use compounds which contain at least two vinyl groups in the molecule for hardening gelatines, especially photographic emulsion layers.

1,3-diacryloyl-5-acylhexahydro-1,3,5-triazines are, for example, also used as hardeners. The melting point of silver halide coatings hardened with such compounds is raised to 60° to 70° C. Divinylsulphones are also known as hardening agents and when added in an amount of 0.5 percent, based on the gelatine, they raise the melting point of photographic coatings to 77° C., after storage for 24 hours at an elevated temperature and increased humidity. Divinylsulphone and divinylketone, which polymerizes quickly when allowed to stand, and 1,3,5-triacryloyl-hexahydro-1,3,5-triazine are also known hardening agents, but they cannot be used industrially because of their harmful physiological properties, this applying, especially, to divinylsulphone. It has been claimed that an addition of 2.5 to 4 percent, based on the gelatine, of these compounds renders photographic coatings resistant to boiling, after they have been stored for 2 to 4 weeks. Also in the case of the known hardening agent methylene-bis-acryloylamide, a hardening effect is noticeable only after a period of storage at an elevated temperature and increased humidity, or after months of storage. Additions of 0.21 to 3.3 percent of methylene-bis-acryloylamide, based on the gelatine, produce melting points of 34° C. seven days after casting. Storage for a further 72 hours at a relative humidity of 94 percent and a temperature of 48° C. raises the melting point to 56° to 96° C.

Compounds which contain an acidic group imparting solubility in water and at least two $\alpha, \beta$-ethylenically unsaturated $\alpha$-halogenocarboxylic acid amide radicals have also been proposed as hardening agents. To develop the hardening effect, cast coatings containing these compounds have to be subjected to an after-treatment at an elevated temperature and increased humidity. It is also known that di-(alkenyl-sulphonic acid amido)-methanes are capable of raising the melting point of gelatine coatings to 80° C. when the coatings are subjected to an aftertreatment at an elevated temperature and increased humidity, but this aftertreatment impairs the photographic properties.

Repeated attempts have been made to improve the hardening effect of the previously proposed compounds by increasing the amount used. The upper limit, however, is soon reached, because a substantial increase in the amount of hardener used impairs the properties of the emulsion in respect of gradation and fogging, and it also impairs the viscosity of the casting solutions.

Modern quick-processing techniques, which operate at high bath and drying temperatures, however, make considerable demands on the resistance of photographic coatings, so that melting points of 90° C. and above have to be attained. For certain color-photographic processes the coatings have to be resistant to strongly acid treatment baths, and they also carry a considerable amount of dyestuff precursors or dyestuffs, which frequently hinder the hardening process. In a continuous manufacturing process it is essential that a sample of the material be capable of being subjected to processing immediately subsequent to manufacture for the purpose of quality control. This means that hardening of the coatings must be sufficiently advanced immediately subsequent to drying to enable the coatings to withstand the action of the baths and the heat-drying process.

The present invention is based on the observation that water-soluble polymers, especially gelatines, may be hardened in an advantageous manner when they are reacted with the compound of the formula

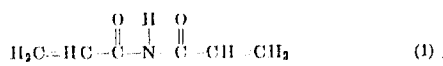

The compound of the formula (1) may be prepared by reacting acrylic acid amide with a halogenacetic acid chloride and then splitting off the hydrogen halide, for example,

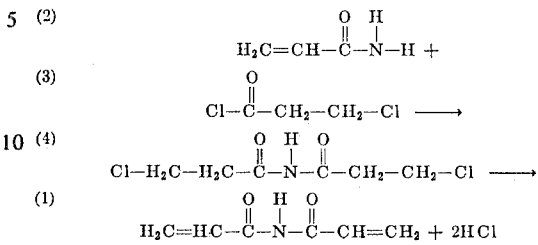

The compound of the formula (2) may be reacted directly with the compound of the formula (3), that is to say, without the use of a solvent or a diluent. If a solvent is to be used for working up or, if necessary, during the reaction, it is expedient to use an inert solvent, for example, a halogenated hydrocarbon, for example, chloroform. Elimination of the hydrogen halide from the $\beta$-halogenoethyl groups is advantageously carried out with the aid of an agent capable of binding acid, for example, a tertiary amine, for example, triethylamine, in an anhydrous organic solvent, for example, acetone.

The compound of the formula (1) so obtained is used in accordance with the invention for hardening water-soluble polymers, for example, polyvinyl alcohol or especially gelatines. It may, however, also be used for other purposes, for example, as a wetting agent in the textile and leather industries, in papermaking, and in the plastics and glue industries.

When hardening gelatines, especially gelatines in the form of photographic coatings, the unsaturated radicals are capable of reacting with the hydroxyl, sulphohydryl, amino or imino groups of the gelatine with formation of a homopolar bond.

The reaction between the gelatine and the compound of the formula (1) generally proceeds easily and in the usual manner. This compound is readily soluble in water or in water-soluble organic solvents, for example, methanol and ethanol, and is added to the gelatine in the form of a solution. The —CO—NH—CO— group confers adequate hydrophilic properties upon the hardener so that it does not precipitate or crystallize out even when a large amount is added to the gelatine. For example, a solution of the hardener in water, ethanol or methanol may be combined with the gelatine at room temperature or at a slightly elevated temperature, and the gelatine, which may contain a silver halide and/or other materials used in the production of photographic images, may be cast on a support to form a coating and, if necessary, dried. The coating may then be allowed to stand for a certain time, for example, 18 hours, at an elevated temperature, or it may be allowed to stand at room temperature. Hardening takes place rapidly and to an increasing degree, and the melting point of the gelatine is raised considerably, for example, by 25°, to 60° C. This increase is largely independent of temperature and time of reaction. The desired degree of hardness can advantageously be adjusted by the amount of hardener used. The amount of hardener employed is advantageously within the range of from 0.05 to 3 percent, based on the amount of dry gelatine. It is evident that hardening of the gelatine is brought about by cross-linkage. Hardening does not impair the photographic properties of the light-sensitive coatings or the reactivity of the color-couplers or dyestuffs. Furthermore, the pH value and the viscosity of the gelatine remain virtually unchanged when the hardener is present. The hardener of the present invention has a special advantage: when applied in a low concentration, the gelatine coatings are sufficiently hard after 18 to 24 hours to permit testing immediately subsequent to manufacture, it being possible to carry out testing at an elevated temperature or in processing baths have a powerful action.

The compound of the formula (1) is also suitable for hardening auxiliary coatings in multilayer materials, for example, separating layers, filter layers or covering layers, and for hardening the substratum and baryta layer. By virtue of its low molecular weight and adequate solubility in water, the compound of the invention diffuses well in multilayer material. This means it need only be added to the auxiliary layers in order to bring about hardening of the silver halide layers to a melting point of 95° C. within 24 hours. An aftertreatment by storage at an elevated temperature and/or increased humidity is superfluous in most cases. The compound of the formula (1) combines a lower molecular weight with a very great hardening capacity so that an addition as small as 0.1 percent, based on the weight of gelatine used, is sufficient to produce an adequate hardening effect. This is not only economical, but it also virtually excludes any impairment of the silver halide emulsion prior to casting or in the finished coating. The compound of the formula (1) can be stored, and it also displays comparatively low toxicity.

Manufacturing procedures

A. A mixture comprising 28.4 grams of acrylamide and 64 grams of β-chloropropionic acid chloride is boiled for 15 minutes, cooled to 80° C. and stirred into 80 ml. of chloroform cooled with ice. The batch is suction-filtered, the residue is washed with a small amount of chloroform and then dried in vacuo at 40° C. After recrystallization from 600 ml. of methanol and 5 grams of charcoal, 78 grams of the compound of the formula (4) are obtained in the form of colorless crystals melting at 142° C.

B. 34 grams of the compound of the formula (4) obtained according to manufacturing procedure A are dissolved in 300 ml. of anhydrous acetone. A solution of 38 grams of triethylamine in 100 ml. of anhydrous acetone is slowly added dropwise while stirring. The batch is stirred for 12 hours at room temperature, the triethylaminechlorohydrate which precipitates is removed by filtration, and the acetone is distilled in vacuo at a bath temperature of 40° C. The residue is recrystallized from 500 ml. of methanol in the presence of 5 grams of active carbon. About 17 grams of the compound of the formula (1) are obtained in the form of colorless crystals melting at 179° C.

EXAMPLE 1

Three solutions are prepared in that 10 ml. of water and 2, 3 and 4 ml. respectively of a 0.25 percent aqueous solution of the compound of the formula (1) are added in each case to 20 ml. of 10 percent gelatine. Each solution is cast on a film measuring 18 cm. × 24 cm. and the films are dried at a circulating air temperature of 38° C. After storage for 24 hours the melting points of the three gelatine coatings are as follows: 81° C., above 95° C., above 95° C.

EXAMPLE 2

Three coating compositions each comprising 1 kg. of silver bromide emulsion and 0.3, 0.6 and 0.9 percent respectively of the hardener of the formula (1) in the form of a 5 percent solution in methyl alcohol (percentages based on the weight of gelatine) are cast on to film. After storage for 24 hours at room temperature, the coatings display a melting point of above 95° C.

EXAMPLE 3

Ten milliliters of a 10 percent gelatine solution colored with a blue azo dyestuff obtained by the two-sided coupling of tetrazotized 1,4-diamino-2,5-dimethoxybenzene with 1-acetylamino-8-hydroxynaphthalene-3,6-disulphonic acid are cast on a glass plate measuring 13 cm. × 18 cm., and the plate is dried. A 10 percent gelatine solution colored with a red azo dyestuff obtained by condensing 2 mols of 7-amino-8-(4'-aminophenylazo)-hydroxy-naphthalene-3,2'-disulphonic acid with 1 mol of thiophene-2,5-dicarboxylic acid dichloride and which contains 1 percent of the hardener of the formula (1), based on the gelatine, is then cast on the glass plate. The plate is dried at a circulating-air temperature of 40° C. and then stored for 40 hours at room temperature. The plate is then immersed in water and the water is slowly heated. The two coatings melt at 90° C. and are inseparable.

EXAMPLE 4

0.1 milliliter of a 2.5 percent solution of the compound of the formula (1) in methyl alcohol is added to 30 ml. of a 5 percent aqueous solution of polyvinyl alcohol.

The solution is cast on a film measuring 18 cm. × 24 cm. and the film is dried for 24 hours at 40° C. The melting point of the coating so obtained is 78° C.

EXAMPLE 5

For purposes of comparison, 8, 10 percent gelatine solutions of 20 ml. each are diluted with 10 ml. of water, a hardener is added as indicated in the following table, and the solutions are cast on film measuring 18 cm. ×24 cm. and the films are dried.

| No. | Hardener solution | M.p. °C. after 24 hours' storage at 38° C. and 50% R.H.+ | M.p. °C. after 24 hours' storage at 43° C. and 69% R.H.+ |
|---|---|---|---|
| 1. | 0.2 ml. methylene-bis-acryloyl-amide (10%) dissolved in dimethylformamide | 34 to 37 | 36 to 41 |
| 2. | 0.4 ml. methylene-bis-acryloyl-amide (10%) dissolved in dimethylformamide | 34 to 37 | 36 to 41 |
| 3. | 0.6 ml. methylene-bis-acryloyl-amide (10%) dissolved in dimethylformamide | 36 to 38 | 36 to 41 |
| 4. | 0.8 ml. methylene-bis-acryloyl-amide (10%) dissolved in dimethylformamide | 36 to 38 | 36 to 41 |
| 5. | 0.2 ml. bis-acryloylimide (2.5%) dissolved in methanol | 90 | |
| 6. | 0.3 ml. bis-acryloylimide (2.5%) dissolved in methanol | >95 | |
| 7. | 0.4 ml. bis-acryloylimide (2.5%) dissolved in methanol | >95 | |
| 8. | 0.6 ml. bis-acryloylimide (2.5%) dissolved in methanol | >95 | |

+R.H. = relative humidity

Whereas bis-acryloylimide displays an excellent hardening action even under relatively mild conditions, no hardening takes place when methylene-bis-acryloyl-amide is used, even at an elevated temperature and increased relative humidity.

We claim:

1. A process for hardening a water-soluble polymer selected from gelatine and polyvinyl alcohol which comprises reacting said polymer with from 0.05 to 3 percent by weight calculated on the polymer used of the imide of the formula

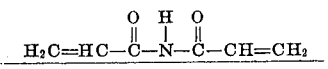

2. A process according to claim 1 wherein said polymer is gelatine.

3. A process according to claim 2 wherein the gelatine is in the form of a photographic emulsion.

* * * * *